(12) United States Patent
de Calmes et al.

(10) Patent No.: US 10,801,163 B2
(45) Date of Patent: Oct. 13, 2020

(54) POLYACRYLIC ADHESIVE FOR USE IN TISSUE PAPER LAMINATING

(71) Applicant: H.B. Fuller Company, St. Paul, MN (US)

(72) Inventors: Nicolas de Calmes, Dainville (FR); Frederic Luraud, Ouchamps (FR); Thierry Lambert, Ouchamps (FR); Rosa-Maria Barbosa, Madalena (PT)

(73) Assignee: H.B. Fuller Company, St. Paul, MN (US)

( * ) Notice: Subject to any disclaimer, the term of this patent is extended or adjusted under 35 U.S.C. 154(b) by 51 days.

(21) Appl. No.: 16/093,922

(22) PCT Filed: Apr. 14, 2017

(86) PCT No.: PCT/US2017/027565
§ 371 (c)(1),
(2) Date: Oct. 15, 2018

(87) PCT Pub. No.: WO2017/180961
PCT Pub. Date: Oct. 19, 2017

(65) Prior Publication Data
US 2019/0085512 A1  Mar. 21, 2019

Related U.S. Application Data

(60) Provisional application No. 62/323,056, filed on Apr. 15, 2016.

(51) Int. Cl.
| D21H 27/36 | (2006.01) |
| C09J 133/08 | (2006.01) |
| C09J 133/10 | (2006.01) |
| B31F 5/04 | (2006.01) |
| B32B 7/12 | (2006.01) |
| B32B 29/00 | (2006.01) |
| D21H 27/00 | (2006.01) |

(52) U.S. Cl.
CPC .............. *D21H 27/36* (2013.01); *B31F 5/04* (2013.01); *B32B 7/12* (2013.01); *B32B 29/005* (2013.01); *C09J 133/08* (2013.01); *C09J 133/10* (2013.01); *B32B 2250/02* (2013.01); *B32B 2250/03* (2013.01); *B32B 2250/26* (2013.01); *B32B 2255/12* (2013.01); *B32B 2255/26* (2013.01); *B32B 2554/00* (2013.01); *B32B 2555/00* (2013.01); *D21H 27/002* (2013.01)

(58) Field of Classification Search
None
See application file for complete search history.

(56) References Cited

U.S. PATENT DOCUMENTS

| 3,844,880 A | 10/1974 | Meisel et al. |
| 4,898,752 A * | 2/1990 | Cavagna ................. B41M 1/04 101/483 |
| 5,055,503 A | 10/1991 | Leake et al. |
| 6,706,145 B2 | 3/2004 | Werres et al. |
| 7,157,389 B2 | 1/2007 | Branham et al. |
| 7,842,163 B2 | 11/2010 | Nickel et al. |
| 7,972,474 B2 * | 7/2011 | Underhill ................ D21F 11/14 162/111 |
| 8,318,281 B2 | 11/2012 | Mansson et al. |
| 2003/0155071 A1 * | 8/2003 | Werres ................... C09J 101/26 156/307.3 |
| 2008/0295985 A1 * | 12/2008 | Moncla ............... D06M 15/227 162/157.6 |
| 2015/0101730 A1 | 4/2015 | Cisowski et al. |

FOREIGN PATENT DOCUMENTS

| EP | 0981589 | 4/2000 |
| EP | 1841470 | 2/2010 |
| EP | 1765137 | 7/2011 |
| WO | WO 2008/058002 | 5/2008 |

* cited by examiner

*Primary Examiner* — Dennis R Cordray
(74) *Attorney, Agent, or Firm* — Daniel J. Barta

(57) ABSTRACT

The present invention relates to a method for manufacturing a multi-ply tissue paper, wherein a first tissue is adhesively bonded to a second tissue using an aqueous, repulpable adhesive composition comprising an alkali soluble acrylic copolymer, The present invention also relates to a multi-ply tissue paper obtained by said manufacturing method.

20 Claims, No Drawings

POLYACRYLIC ADHESIVE FOR USE IN TISSUE PAPER LAMINATING

BACKGROUND

The present invention relates to polyacrylic adhesive for use in tissue paper laminating. In particular the present invention relates to a method for manufacturing a multi-ply tissue paper, Wherein a first tissue is adhesively bonded to a second tissue using an aqueous, repulpable adhesive composition comprising an alkali soluble acrylic copolymer. The present invention also relates to a multi-ply tissue paper obtained by said manufacturing method.

Tissue papers such as toilet, tissues, facial tissues, tissue wipes, paper towels are commonly used in everyday life.

Needs and expectations of today's consumers for tissue papers mainly concern the softness and the strength of the tissue paper. As a result, it is required to develop multi-ply tissue papers comprising at least two plies to confer thickness, softness and strength to the tissue paper in conditions fulfilling the manufacturing constraints of industry.

In a multi-ply tissue paper, all the plies should remain joined together. This can be achieved by adhesively bonding one tissue ply to another tissue ply with adhesives, the composition of which being suitable for application using various means available in industry.

Widely used adhesive compositions comprise polyvinyl alcohol (PVOH), polyvinyl acetates, carboxymethyl cellulose or starch based adhesives. Currently PVOH dominates the market, especially for paper products having multiple plies, in particular having at least 3 plies.

For example, European patent EP0981589 discloses a PVOH-based aqueous adhesive composition for laminating an absorbent paper product having multiple plies.

European patent EP1841470 discloses a method for manufacturing a multi-ply tissue paper, wherein the plies are adhesively bonded by means of cold glue, preferably a PVOH-based cold glue.

SUMMARY

The inventors have surprisingly found that an aqueous adhesive composition comprising an alkali soluble acrylic copolymer can be repulpable which renders it suitable for use in the field of tissue papers and can be formulated to be adapted for various conditions of use depending especially on the number of plies of the manufactured product. Said adhesive composition does not form adhesive particles, commonly referred to as "stickies", and can thus be used on machines using recycled paper fiber.

The present invention offers many advantages. One advantage of the invention is that the total solids content of said adhesive composition comprising the acrylic copolymer can be greater than that obtained using previously commonly known adhesive composition in the field, for example comprising PVOH. Composition having high solids content may thus be used in processes that enable applying less quantities of the composition, thus helping to save money. Said adhesive composition comprising the acrylic copolymer can also be diluted with water on site to the desired solids content, thus saving on the cost of shipping water, without compromising the desired lamination requirements for multi-ply tissue papers.

Other advantages of the invention are the fact that tissue paper manufacturers have the possibility to choose their application systems since said adhesive composition comprising the acrylic copolymer is suitable for spray and roll coating applications. In particular it has improved spraying properties, which is a clear advantage since nozzle application systems are increasingly being used nowadays. Said adhesive composition comprising the acrylic copolymer has also better rheology for application giving easier application and enhances the tissue softness of the multi-ply tissue paper.

Unlike the standard technology based on PVOH where paper fibers are bonded through the adhesive by hydrogen bonds, the new adhesive technology of the invention provides superior bonding and anchorage via different interactions between the saponified carboxyl group(s) of the acrylic copolymer and the paper fiber. Lower coat weights and the bonding of more tissue plies are thus observed.

Surprisingly, said adhesive composition comprising the acrylic copolymer did pass dispersibility testing as required by the tissue paper manufacturers. This was unexpected since acrylic copolymers tend to have a lot of tack.

DETAILED DESCRIPTION

The present invention provides a method for manufacturing a multi-ply tissue paper, comprising the steps of:

(a) providing a first tissue comprising at least one tissue ply;

(b) applying an aqueous, repulpable adhesive composition comprising an alkali soluble acrylic copolymer to the surface area of one face of the first tissue;

(c) providing a second tissue comprising at least one tissue ply;

(d) laminating the first tissue to the second tissue together by contacting the face of the first tissue provided with the adhesive composition with one face of the second tissue, thereby forming a multi-ply tissue paper, wherein the plies are adhesively bonded to one another;

(e) optionally providing the multi-ply tissue paper of step as a first tissue comprising at least one tissue ply and repeating steps (b) to (d).

The order of steps (a) to (c) may be changed. The first tissue of step (a) may be a newly provided tissue comprising at least one tissue ply or may be the multi-ply tissue paper of step (d).

As used herein, the term "a tissue ply" refers to a single sheet of tissue paper.

As used herein, the term "a multi-ply tissue paper" refers to a paper comprising at least two tissue plies.

As used herein, the term "comprise" can also be referred to as the term "include" or "contain". The term "comprise" includes the term "consist of".

As used herein, the term "a tissue paper" refers to a class of low weight papers that are produced from paper fibers, i.e. encompassing mainly cellulosic fibers, according to manufacturing methods known in the art. The paper fibers can be made from virgin and/or recycled paper. In the present invention, the tissue paper is mainly used for sanitary or domestic purposes. Expected characteristics of the tissue paper are softness, strength, especially wet-strength and lint-free.

As used herein, the term "laminating" refers to a process in Which two tissues comprising at least one tissue ply are assembled together, for example using adhesive bonding.

In a particular embodiment of the invention, the tissue paper is selected from the group consisting of a toilet tissue, a facial tissue, a tissue wipe and a paper towel, preferably a toilet tissue and a paper towel.

In a particular embodiment of the invention, the multi-ply tissue paper consists of two tissue plies.

In another particular embodiment of the invention, the multi-ply tissue paper comprises at least three tissue plies, preferably consists of 3, 4 or 5 tissue plies.

As used herein, the term "adhesive composition" refers to a composition having adhesive properties allowing the binding, optionally permanent binding of at least two tissue papers together.

The adhesive composition of the invention is water-based so that it is easy-to-use, non-toxic, cheap and complies with the environmental regulations.

The adhesive composition of the invention should be non-toxic, in particular should be free of alkylphenol ethoxylate, ethoxylated derivatives, borated compounds or boron derivatives, fully repulpable and comply with the regulations relevant to the adhesives and tissue industry, in particular comply with current regulations such as FDA 175 105 ("adhesives"), BFR XXXVI ("paper and board for food contact"), BFR XIV ("polymer dispersions") and/or EN 648 ("paper and paperboard treated by optical bleaching agents for food contact", for example for use in kitchen rolls, where the tissue paper can be with or without recycling part or treated or not with optical brightener).

As used herein, the term "repulpable" means that the adhesive composition can be recycled from the tissue paper under temperature and pH conditions commonly used in classical repulping methods. In particular it should comply with the European regulations, for example with the INGEDE Method 12 that assesses the recyclability of printed paper products.

As used herein, the term "alkali soluble acrylic copolymer" means that the acrylic copolymer may be dissolved, preferably fully dissolved, in an aqueous medium comprising an alkali.

In a particular embodiment of the invention, the total solids content of the adhesive composition as used in the manufacturing method ranges from about 1% to about 50% by weight.

In a preferred embodiment of the invention, the total solids content of the adhesive composition as used in the manufacturing method ranges from about 1% to about 40% by weight, more preferably from about 10% to about 30% by weight.

As used herein, the term "adhesive composition as used in the manufacturing method" refers to the final adhesive formulation as used in the manufacturing method, i.e. as directly applied to the tissue paper, and thus corresponds to an adhesive composition comprising the alkali soluble acrylic copolymer of the invention and optionally one or more additives as defined below.

Said adhesive composition as used in the manufacturing method can originate from a "ready-to-use adhesive composition" or a "concentrated adhesive composition".

As used herein, the term "ready-to-use adhesive composition" refers to an adhesive composition having a total solids content ranging from about 5% to about 40% by weight, preferably from about 10% to about 30% by weight, which can be directly applied to the tissue paper without having to be diluted with water. Said "ready-to-use adhesive composition" comprises the alkali soluble acrylic copolymer of the invention and optionally one or more additives as defined below.

As used herein, the term "concentrated adhesive composition" refers to an adhesive composition having a high total solids content, in particular a total solids content superior to 30% by weight, preferably a total solids content ranging from about 30% to about 60% by weight, preferably from about 30% to about 50% by weight, which can be diluted with water to the desired solids content before being directly applied to the tissue paper. Said "concentrated adhesive composition" can thus be shipped to the customer at high solids content, and further diluted on site to the desired solids content in order to save on shipping costs. Said "concentrated adhesive composition" comprises the alkali soluble acrylic copolymer of the invention and optionally one or more additives as defined below.

As used herein, the term "about" refers to a value such as an amount, a weight, a percentage, a parameter and the like, that encompasses small variations from the specified value, for example a variation of less than 2%, preferably less than 1% and even more preferably less than 0.1%. The value recited after the term "about" is specifically disclosed.

In a preferred embodiment of the invention, said adhesive composition as used in the manufacturing method is a solution. The strength of said solution as percentage by mass can be measured using a refractometer, for example a refractometer Brix.

The adhesive composition of the invention is applied to the surface area of one is face of the first tissue, in particular to substantially all the surface area of said one face of the first tissue.

In another embodiment of the invention, the adhesive composition is applied to at least a portion of the surface area of one face of the first tissue.

In another particular embodiment of the invention, the adhesive composition is applied to the surface area of one face of the first tissue using anilox roller means, for example using a gravure roller, in particular is applied to at least a portion of the surface area of said one face of the first tissue or to the full surface area of said one face of the first tissue.

When the roller technology is used, the total solids content of said adhesive composition as used in the manufacturing method ranges from about 1% to about 10% by weight. Said total solids content of said adhesive composition as used in the manufacturing method is obtained after dilution with water of either a "ready-to-use adhesive composition" as previously defined or a "concentrated adhesive composition" as previously defined, to obtain the desired solids content.

In an advantageous embodiment of the invention and when the roller technology is used, said adhesive composition as used in the manufacturing method is a solution. The strength of said solution as percentage by mass can be measured using a refractometer, for example a refractometer Brix.

In another particular embodiment of the invention, the adhesive composition as used in the manufacturing method is applied to the surface area of one face of the first tissue by spray means, in particular is applied to at least a portion of the surface area of said one face of the first tissue or to the full surface area of said one face of the first tissue.

The spray technology is particularly useful to provide a tissue paper comprising at least two tissue plies, preferably at least 3 tissue plies.

When the spray technology is used, the total solids content of said adhesive composition as used in the manufacturing method ranges from about 5% to about 40% by weight, preferably from about 20% to about 25% by weight, more preferably is about 22% by weight. Said adhesive composition as used in the manufacturing method can be a "ready-to-use adhesive composition" as previously defined which is used as it is formulated, or a "concentrated adhesive composition" as previously defined which is diluted with water to obtain the desired solids content.

In an advantageous embodiment of the invention and when the spray technology is used, said adhesive composition as used in the manufacturing method is a solution. The strength of said solution as percentage by mass can be measured using a refractometer, for example a refractometer Brix.

The spray technology is particularly useful to provide a two-ply tissue paper or a three-ply tissue paper, preferably a two-ply tissue paper, Classical nozzles, i.e. flat and conic nozzles, can be used in a spray system.

The adhesive composition may comprise one or more additives that are commonly used in the field of adhesives and tissue industry.

The person skilled in the art will choose said at least one additive and its amount depending on the type of tissue paper to be used and the type of application so that it does not modify the adhesive and preferably repulpable properties of the adhesive composition of the invention.

In a particular embodiment of the invention, the adhesive composition further comprises at least one additive selected from the group consisting of preservatives, defoamers, buffers, anti-oxidants, anti-corrosive agents, fragrance, wetting agents, ultraviolet dyes, plasticizers, humectants, starch or starch derivatives, and combinations thereof.

In a particular embodiment of the invention, the adhesive composition as used in the manufacturing method comprises from about 0.01% to about 35%, preferably from about 0.01% to about 25%, or even from about 0.01% to about 10% by weight of said at least one additive.

In a preferred embodiment of the invention, the adhesive composition as used in the manufacturing method comprises a saponified acrylic copolymer, in particular a fully or partially saponified acrylic copolymer, preferably a fully saponified acrylic copolymer.

As used herein, the term "copolymer" refers to a copolymer formed from the copolymerization of at least two different types of monomers. This term includes bipolymers, terpolymers, quaterpolymers, etc . . . according to the number of used monomer species. This term also includes different types of copolymers, such as alternating copolymers, periodic copolymers, random copolymers, block copolymers, linear copolymers and branched copolymers.

As used herein, the term "acrylic copolymer" refers to a general term for a copolymer formed from the copolymerization of at least two acrylic monomers, such as (meth)acrylic acids and their esters.

As used herein, the term "monomer" refers to any chemical compound that can form a covalent bond with itself, another monomer or another chemical compound in a repetitive manner.

The types of acrylic copolymers that can be used in the present invention are not limited to the following examples.

The acrylic copolymer of the invention may be obtained by selecting one or more features from a single or a separate list of constituents defined below.

The acrylic copolymer of the invention is obtained from the copolymerization of at least two esters of (meth)acrylic acids.

The acrylic copolymer of the invention is produced by copolymerization methods well-known in the art.

In a particular embodiment of the invention, the acrylic copolymer is formed by emulsion polymerization. Emulsion polymerization is carried out according to standard procedures. Preferably, the emulsion polymerization is carried out in an aqueous medium in the presence of a surfactant and free-radical initiators. More preferably, the emulsion polymerization is carried out in the monomer droplets emulsified in an aqueous medium.

In a particular embodiment of the invention, a saponification step is carried out to neutralize the acrylic copolymer of the invention.

Before the saponification step, the acrylic copolymer of the invention is in the form of an aqueous emulsion or dispersion. As used herein, the term "emulsion" refers to a stable two-phase system where fine particles of the acrylic copolymer are dispersed in the aqueous medium. The term "dispersed" means that said fine particles of the acrylic copolymer are distributed throughout the aqueous medium.

In a particular embodiment of the invention, before the saponification step, the pH of the aqueous emulsion or dispersion comprising the acrylic copolymer ranges from about 3 to about 6.

Examples of commercially available alkali soluble acrylic copolymer emulsions or dispersions include Axilat® 1819 supplied by Momentive, Neocryl® BT9 supplied by DSM Coating Resins, LLC, Acryltac® 3900 supplied by HB Fuller and Acryltac® 3910 supplied by HB Fuller.

In a particular embodiment of the invention, the saponification step is carried out using any alkali base, preferably sodium hydroxide (NaOH), ammonia ($NH_3$) or potassium hydroxide (KOH). Said alkali is added in an amount sufficient to neutralize the acrylic copolymer, i.e. to obtain a neutralized acrylic copolymer.

Following the addition of the alkali to the aqueous emulsion or dispersion comprising the acrylic copolymer of the invention, i.e. after the saponification step, a solution, in particular a transparent, medium to highly viscous solution is obtained. As used herein, the term "solution" refers to a homogenous mixture where the acrylic copolymer is completely solubilized in the alkali medium.

In a particular embodiment of the invention, after the saponification step, the pH of the solution comprising the acrylic copolymer ranges from about 7 to about 9.

In a particular embodiment of the invention, after the saponification step, the pH of the adhesive composition as used in the manufacturing method, which comprises the alkali soluble acrylic copolymer of the invention and optionally one or more additives as previously defined, ranges from about 7 to about 9.

Preferably, the main components of the acrylic copolymer are alkyl acrylates and alkyl methacrylates.

In a particular embodiment of the invention, the acrylic copolymer is formed from at least one alkyl(meth)acrylate monomer.

As used herein, the term "(meth)acrylate" refers either to the acrylate or to the methacrylate or to a mixture of both the acrylate and methacrylate. Similarly, the term "(alkyl(meth) acrylate" refers either to the alkyl acrylate or to the alkyl methacrylate or to a mixture of both the alkyl acrylate and alkyl methacrylate.

As used herein, the term "alkyl" includes linear and branched alkyl groups.

In a particular embodiment of the invention, the alkyl group of the alkyl (meth)acrylate monomer is a linear or branched alkyl group having 1 to 20 carbon atoms.

Examples of a linear or branched alkyl group having 1 to 20 carbon atoms include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a tert-pentyl group, a sec-pentyl group, a 3-pentyl group, a n-hexyl group, an isohexyl group, a n-heptyl group, a n-octyl group, an iso-octyl group, a 2-ethylhexyl group, a nonyl group, an isononyl group, a decyl group, an isodecyl group, an undecyl group, a dodecyl group, a tridecyl group, a tetradecyl group, a pentadecyl group, a hexadecyl group, a heptadecyl group, an octadecyl (stearyl) group, a nonadecyl group, and an eicosyl group.

In a preferred embodiment of the invention, said linear or branched alkyl group having 1 to 20 carbon atoms is selected from the group consisting of a methyl group, an ethyl group, a n-propyl group, a n-butyl group, a n-pentyl group, a n-hexyl group, a n-heptyl group, a n-octyl group, a nonyl group, a decyl group, an undecyl group, a dodecyl group, a tridecyl group, a tetradecyl group, a pentadecyl group, a hexadecyl group, a heptadecyl group, an octadecyl (stearyl) group, a nonadecyl group and an eicosyl group.

Examples of alkyl (meth)acrylates include methyl (meth) acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth) acrylate, n-pentyl (meth)acrylate, isopentyl (meth)acrylate, neopentyl (meth)acrylate, tert-pentyl (meth)acrylate, sec-pentyl (meth)acrylate, 3-pentyl (meth)acrylate, n-hexyl (meth)acrylate, isohexyl (meth)acrylate, n-heptyl (meth) acrylate, n-octyl (meth)acrylate, iso-octyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth) acrylate and eicosyl (meth)acrylate.

In a preferred embodiment of the invention, the alkyl (meth)acrylate is selected from the group consisting of methyl (meth)acrylate, ethyl (meth)acrylate, propyl (meth) acrylate, butyl (meth)acrylate and 2-ethylhexyl (meth)acrylate.

More than one type of alkyl (meth)acrylate as previously defined can be used to prepare the acrylic copolymer.

In a more preferred embodiment of the invention, the acrylic copolymer is formed from at least one butyl acrylate monomer and at least one methyl methacrylate monomer.

In another particular embodiment of the invention, the acrylic copolymer is formed from a plurality of monomers including at least one alkyl (meth)acrylate monomer as previously defined and at least one another monomer that is able to copolymerize with said alkyl (meth)acrylate.

Said at least one another monomer that is able to copolymerize with said alkyl (meth)acrylate may be selected from the group consisting of aromatic vinyl compounds of the styrene-type, vinyl acetate, butyl methacrylate, hydroxypropyl methacrylate, lauryl (meth)acrylate, hydroxyalkyl (meth)acrylates such as hydroxyethyl (meth)acrylate, hydroxypropyl (meth)acrylate and hydroxybutyl (meth) acrylate, and N-vinyl lactames such as N-vinyl pyrrolidone.

Said at least one another monomer that is able to copolymerize with said alkyl (meth)acrylate may comprise some functional groups enhancing the solubility of the acrylic copolymer in water.

In a preferred embodiment of the invention, the acrylic copolymer is formed from at least one alkyl (meth)acrylate monomer as previously defined and at least one further monomer comprising acid functionality, preferably carboxylic acid functionality.

Said at least one further monomer comprising acid functionality may be selected from the group consisting of monomers comprising carboxylic acid, sulfonic acid and phosphonic acid functionalities. Examples of monomers comprising carboxylic acid functionality include acrylic acid, methacrylic acid, crotonic acid, fumaric acid, maleic acid and itaconic acid. Examples of monomers comprising sulfonic acid functionality include vinylsulfonic acid and 2-acrylamido-2-methylpropanesulfonic acid. Examples of monomers comprising phosphonic acid functionality include vinylsulfonic acid.

In a particular embodiment of the invention, the acrylic copolymer is formed in the presence of at least one constituent selected from the group consisting of a carboxylic acid protective colloid such as acrylic acid and methacrylic acid, an anionic surfactant such as phosphate esters, for example ethoxylated phosphate branched C13 alcohol, dodecylbenzenosulfonate and dioctylsulfosuccinate, a nonionic surfactant such as fatty alcohol polyglycol ether and PE/PO block copolymers, and combinations thereof.

The person skilled in the art will choose said at least one constituent and its amount depending on the type of tissue paper to be used and the type of application so that it does not modify the properties of the adhesive composition of the invention.

In the present invention, the acrylic copolymer does not contain crosslinking grafted groups.

In a particular embodiment of the invention, the acrylic copolymer has an acid number ranging from about 60 mg KOH/g polymer to about 160 mg KOH/g polymer, preferably from about 80 mg KOH/g polymer to about 130 mg KOH/g polymer.

In a particular embodiment of the invention, the acrylic copolymer has a glass transition temperature (Tg) ranging from about −20° C. to about 40° C., preferably from about −7° C. to 40° C. The glass transition temperature (Tg) is measured by the classical Differential Scanning calorimetric (DSC) method.

In a particular embodiment of the invention, the acrylic copolymer has an average molecular weight (Mw) ranging from about 10,000 g/mole to about 300,000 g/mole, preferably from about 20,000 g/mole to about 100,000 g/mole, and more preferably from about 30,000 g/mole to about 70,000 g/mole.

In other embodiments, a higher molecular weight is preferred. In these embodiments, the acrylic copolymer has an average molecular weight (Mw) ranging from about 30,000 g/mole to about 750,000 g/mole, from about 50,000 g/mole to about 500,000 g/mole, or even from about 75,000 g/mole to about 300,000 g/mole.

The average molecular weight (Mw) of the acrylic copolymer may be measured by Gel Permeation Chromatography (GPC), for example using tetrahydrofuran (THE) as a solvent.

The present invention also relates to a multi-ply tissue paper obtained by the manufacturing method according to the invention.

The following examples further illustrate the invention, but should not be construed to limit the scope of the invention in any way.

EXAMPLES

Example 1: Examples of Commercially Available Alkali Soluble Acrylic Copolymer Dispersions

TABLE 1

Axilat ® 1819, which is an alkali soluble acrylic copolymer dispersion, supplied by Momentive.

| Component | |
|---|---|
| Axilat ® 1819 Property | |
| Solids content (%) | 49-51 |
| pH of the dispersion (before saponification) | 4-5 |
| Viscosity, 250 s$^{-1}$ (mPa · s) | 20-300 |
| Viscosity after alkaline transfer, solution 16%, 50 s$^{-1}$ (mPa · s) | 950-1,550 |
| Tg (DSC) (° C.) | 20 |

TABLE 2

Neocryl ® BT9, which is an alkali soluble acrylic copolymer dispersion, supplied by DSM Coating Resins, LLC.

| Component | |
|---|---|
| Neocryl ® BT9 Property | |
| Solids content (%) | 39-41 |
| pH of the dispersion (before saponification) | 5-6 |
| Viscosity, Brookfield 25° C. (mPa · s) | 10-25 |
| Tg (° C.) | 1 |

TABLE 3

Acryltac ® 3900, which is an alkali soluble acrylic copolymer dispersion, supplied by HB Fuller.

| Component | |
|---|---|
| Acryltac ® 3900 Property | |
| Solids content (%) | 52.0 ± 0.5 |
| pH of the dispersion (before saponification) | 4.0 ± 0.3 |
| Viscosity, Brookfield 20° C., cP | 1550 ± 660 |
| Theoretical Tg (° C.) | −7 |
| Experimental Tg (° C.) | 15 |
| Average molecular weight, Mw (g/mol) | 44800 ± 2100 |
| Number molecular weight, Mn (g/mol) | 6920 ± 220 |
| Polydispersity (Mw/Mn) | 6.48 ± 0.12 |
| Solubility in THF (%) | 98 |

To be noted that the solution obtained after saponification of Acryltac® 3900 has a viscosity (Polymer:Water:NaOH 33%=80:80:12.5), 26° C. of 12900±2400 and a pH of 7.7±0.2.

TABLE 4

Acryltac ® 3910, which is an alkali soluble acrylic copolymer dispersion, supplied by HB Fuller.

| Component | |
|---|---|
| Acryltac ® 3910 Property | |
| Solids content (%) | 52.2 ± 0.4 |
| pH of the dispersion (before saponification) | 4.6 ± 0.3 |

TABLE 4-continued

Acryltac ® 3910, which is an alkali soluble acrylic copolymer dispersion, supplied by HB Fuller.

| | |
|---|---|
| Viscosity, Brookfield 20° C., cP | 1800 ± 950 |
| Theoretical Tg (° C.) | −4 |
| Experimental Tg (° C.) | 2 |
| Average molecular weight, Mw (g/mol) | 44700 ± 2100 |
| Number molecular weight, Mn (g/mol) | 5950 ± 190 |
| Polydispersity (Mw/Mn) | 7.52 ± 0.14 |
| Solubility in THF (%) | 94 |

To be noted that the solution obtained after saponification of Acryltac® 3910 has a viscosity (Polymer:Water:NaOH 33%=80:80:12.5), 26° C. of 8400±1300 and a pH of 7.8±0.2.

Example 2: Examples of Adhesive Compositions that can be Used in the Manufacturing Method

TABLE 5

Formulation 1 based on Axilat ® 1819, which is an alkali soluble acrylic copolymer dispersion, supplied by Momentive. Acticide ® MBS is a biocide available from Thor Group Limited.

| | Weight (%) |
|---|---|
| Component | |
| Axilat ® 1819 | 42.1 |
| Water | 42.1 |
| NaOH 33% | 2.6 |
| Acticide ® MBS | 0.2 |
| Lemon perfume | 0.020 |
| Water (to adjust viscosity) | 13.0 |
| Property | |
| Total solids w/w | 20.0% |
| pH | 7.8 |
| Viscosity (mPa · s) | 15000 |

TABLE 6

Formulation 2 based on Neocryl ® BT9, which is an alkali soluble acrylic copolymer dispersion, supplied by DSM Coating Resins, LLC.

| | Weight (%) |
|---|---|
| Component | |
| Neocryl ® BT9 | 70.6 |
| Water | 23.5 |
| NaOH 33% | 2.4 |
| Acticide ® MBS | 0.2 |
| Water (to adjust viscosity) | 3.3 |
| Property | |
| Total solids w/w | 25.0% |
| pH | 7.7 |
| Viscosity | 80 mPa · s |

TABLE 7

Formulation 3 based on Acryltac ® 3900, which is an alkali soluble acrylic copolymer dispersion, supplied by HB Fuller. Agitan ® 381 is a defoamer available from Munzing Chemie GmbH.

| Component | Weight (%) |
|---|---|
| Acryltac ® 3900 | 39.5 |
| Water | 39.5 |
| NaOH 33% | 6.0 |
| Water (to adjust viscosity) | 14.4 |
| Agitan ® 381 | 0.4 |
| Acticide ® MBS | 0.2 |
| Property | |
| Total solids w/w | 22.0% |
| pH | 7.8 |
| Viscosity | 294 mPa · s |

TABLE 8

Formulation 4 based on Acryltac ® 3910, which is an alkali soluble acrylic copolymer dispersion, supplied by HB Fuller.

| Component | Weight (%) |
|---|---|
| Acryltac ® 3910 | 33.3 |
| Water | 38.0 |
| NaOH 33% | 3.3 |
| Water (to adjust viscosity) | 24.7 |
| Agitan ® 381 | 0.3 |
| Acticide ® MBS | 0.2 |
| Property | |
| Total solids w/w | 17% |
| pH | 7.7 |
| Viscosity | 268 mPa · s |

Example 3: Spray Testing

To evaluate the spray ability of an adhesive composition comprising an acrylic copolymer to be used in the method for manufacturing a multi-ply tissue paper according to the invention, the inventors have carried out a spray testing using an approved and widely used adhesive solution comprising PVOH (Standard PVOH solution, herein referred to as the "control solution", Table 9) and a solution comprising an alkali soluble acrylic copolymer (a solution obtained after saponification of Acryltac® 3900 supplied by HB Fuller, herein referred to as the "polyacrylic solution of the invention"; Formulation 3, Table 7). Moreover, to test the possibility of using different nozzle application systems, the inventors have tested two different nozzles, flat and conic. For the polyacrylic solution of the invention, at the end of the spray testing, the inventors stopped the nozzle application system during 25 minutes and were then able to restart and reuse it without any problems. No cleaning step was required.

Test conditions: Atomizing air pressure=1 bar; Adhesive pressure=0.02 bar.

TABLE 9

Standard PVOH solution
Mowiol ® 23/88 is a polyvinyl alcohol available from Kurary Europe GmbH

| Component | Weight (%) |
|---|---|
| Mowiol ® 23/88 | 8.34 |
| Water | 91.16 |
| Heat at 90° C. and cool down at 40° C. | |
| Agitan ® 381 | 0.3 |
| Acticide ® MBS | 0.2 |
| Property | |
| Total solids w/w | 9% |
| pH | 5.5 |
| Viscosity | 320 mPa · s |

TABLE 10

Comparison of spray testing between a standard PVOH solution and an adhesive composition comprising an alkali soluble acrylic copolymer according to the invention (based on Acryltac ® 3900)

| Adhesive composition | Standard PVOH solution (Control solution) | Formulation 3 Polyacrylic solution of the invention (based on Acryltac ® 3900) |
|---|---|---|
| Main component | PVOH | Alkali soluble acrylic copolymer |
| Form | Solution | Solution |
| Total solids w/w (%) | 9 | 22 |
| pH | 4-6 | 7-9 |
| Spray testing | | |
| Flat nozzle-spray width (cm) | 7.5 | 25 |
| Flat nozzle-maximum adhesive (80%) concentration width (cm) | 4 | Not determined |
| Conic nozzle-spray width (cm) | 4 | 7 |
| Conic nozzle-maximum adhesive (80%) concentration width (cm) | 2 | 3 |

The results as shown in Table 10 demonstrated that the polyacrylic solution of the invention was suitable for use in different nozzle application systems. No issue related to a possible clogging of the flat or conic nozzle was observed for both the polyacrylic solution of the invention and the control solution. Surprisingly, better results were obtained using said polyacrylic solution. Indeed the spray width was clearly higher using said polyacrylic solution. Moreover the maximum adhesive (80%) concentration width of said polyacrylic solution using the flat nozzle could not be determined due to the fact that the adhesive was evenly distributed, an improved tissue ply binding should thus be expected. In conclusion, the polyacrylic solution of the invention had higher spray abilities than the control and widely used solution comprising PVOH.

Example 4: Dispersion Tests

An important criterion of the invention was to obtain a repulpable adhesive composition that could be recycled from the tissue paper under temperature and pH conditions commonly used in classical repulping methods.

Thus the inventors carried out some dispersion tests using Acryltac® 3900 and Acryltac® 3910, which are alkali soluble acrylic copolymer dispersions supplied by HB Fuller, to evaluate their dispersion character in accordance with European regulations, using the INGEDE Method 12.

To do so, the Acryltac® 3900 dispersion or the Acryltac® 3910 dispersion was applied manually to a given surface area of a test paper made of virgin fibers without any additives, before being dried. The pulping conditions were then carried out according to the INGEDE Method 12 under alkaline conditions and the dispersion rate was determined using classical methods well-known to the skilled person when no macro-stickies (<500 mm²/kg) were detected. The INGEDE Method 12 evaluated the quantity and the size distribution of the macro-stickies formed by the adhesive film fragmentation, while the dispersion rate determined the proportion of adhesive dispersed in the aqueous phase. Normally when macro-stickies are detected, the tested product should not be dispersible.

TABLE 11

Evaluation of the dispersion character of Acryltac ® 3900 and Acryltac ® 3910 dispersions

| | INGEDE METHOD 12 | | |
|---|---|---|---|
| | Number of macro-stickies (mm²/kg) | % macro-stickies <2000 μm | Dispersion test Dispersion rate (%) |
| Acryltac ® 3900 | <300 | Not determined | 132 |
| Acryltac ® 3910 | <300 | Not determined | 141 |

Most acrylic copolymers tend to have a lot of tack. Surprisingly the inventors found that both the Acryltac® 3900 and Acryltac® 3910 dispersions comprising an alkali soluble acrylic copolymer did not form macro-stickies. Indeed, as shown in Table 11, the observed number of macro-stickies was inferior to 300 mm²/kg, which corresponded to a value close to the background. Interestingly both the Acryltac® 3900 and Acryltac® 3910 dispersions achieved a high dispersion rate, proving that both dispersions were fully dispersible. To be noted that the dispersion rate was superior to 100% due to the alkaline conditions of the INGEDE Method 12. Said alkaline conditions induced saponification of all ester groups of the alkali soluble acrylic copolymer.

In conclusion, both the Acryltac® 3900 and Acryltac® 3910 dispersions did not form macro-stickies and did pass dispersion tests as required by the tissue paper manufacturers.

The invention claimed is:

1. A method for manufacturing a multi-ply tissue paper, the method comprising:
   applying an aqueous, repulpable adhesive composition comprising an alkali soluble acrylic copolymer to a surface area of a face of a first tissue comprising at least one tissue ply, the acrylic copolymer being a fully or partially saponified acrylic copolymer;
   laminating a second tissue comprising at least one tissue ply to the first tissue by contacting the face of the first tissue having the adhesive composition with a face of the second tissue, thereby forming a multi-ply tissue paper having plies adhesively bonded to one another.

2. The method according to claim 1, wherein the tissue paper is selected from the group consisting of a toilet tissue, a facial tissue, a tissue wipe and a paper towel.

3. The method according to claim 1, wherein the multi-ply tissue paper comprises at least three tissue plies.

4. The method according to claim 1, wherein the total solids content of the adhesive composition ranges from about 10% to about 30% by weight.

5. The method according to claim 1, wherein the adhesive composition is applied to the surface area of one face of the first tissue using anilox roller means.

6. The method according to claim 5, wherein the total solids content of the adhesive composition ranges from about 1% to about 10% by weight.

7. The method according to claim 1, wherein the adhesive composition is applied to the surface area of one face of the first tissue by spray means.

8. The method according to claim 1, wherein the acrylic copolymer is formed by emulsion polymerization.

9. The method according to claim 1, wherein the acrylic copolymer is formed from at least one alkyl (meth)acrylate monomer.

10. The method according to claim 9, wherein the acrylic copolymer is formed from at least one further monomer comprising carboxylic acid functionality.

11. The method according to claim 1, wherein the acrylic copolymer is formed from at least one butyl acrylate monomer and at least one methyl methacrylate monomer.

12. The method according to claim 1, wherein the acrylic copolymer has an acid number ranging from about 60 mg KOH/g polymer to about 160 mg KOH/g polymer.

13. The method according to claim 1, wherein the acrylic copolymer has a glass transition temperature (Tg) ranging from about −20° C. to about 40° C.

14. The method according to claim 1, wherein the acrylic copolymer has an average molecular weight (Mw) ranging from about 10,000 g/mole to about 300,000 g/mole.

15. A multi-ply tissue paper comprising:
   a first tissue including at least one tissue ply;
   an aqueous, repulpable adhesive composition comprising an alkali soluble acrylic copolymer on a surface area of a face of the first tissue, the acrylic copolymer being a fully or partially saponified acrylic copolymer; and
   a second tissue, including at least one tissue ply, laminated to the first tissue through the adhesive composition on the face of the first tissue, the multi-ply tissue paper having the first tissue and second tissue adhesively bonded to one another.

16. The multi-ply tissue paper of claim 15, wherein the acrylic copolymer is formed from at least one butyl acrylate monomer and at least one methyl methacrylate monomer.

17. The multi-ply tissue paper of claim 15, wherein the acrylic copolymer is formed from at least one alkyl (meth) acrylate monomer.

18. The multi-ply tissue paper of claim 17, the acrylic copolymer is formed from at least one further monomer comprising carboxylic acid functionality.

19. The multi-ply tissue paper of claim 15, wherein the adhesive composition has a solids content from about one % to about 40% by weight, based on the total weight of the emulsion.

20. The multi-ply tissue paper of claim 15, the acrylic copolymer has an average molecular weight (Mw) ranging from about 10,000 g/mole to about 300,000 g/mole.

* * * * *